(12) United States Patent
Fan

(10) Patent No.: US 6,241,269 B1
(45) Date of Patent: *Jun. 5, 2001

(54) DRIVE MECHANISM FOR VEHICLE

(76) Inventor: Ronnie Chee Keung Fan, 1082 Leland Dr., Lafayette, CA (US) 94549

( * ) Notice: Subject to any disclaimer, the term of this patent is extended or adjusted under 35 U.S.C. 154(b) by 0 days.

This patent is subject to a terminal disclaimer.

(21) Appl. No.: 09/369,408

(22) Filed: Aug. 5, 1999

Related U.S. Application Data

(63) Continuation-in-part of application No. 09/219,565, filed on Dec. 21, 1998.

(51) Int. Cl.[7] .................................................... B62K 21/00
(52) U.S. Cl. ...................... 280/265; 280/87.043; 280/257
(58) Field of Search .............................. 280/265, 87.043, 280/11.115, 253, 256, 257

(56) References Cited

U.S. PATENT DOCUMENTS

| 878,582 | * | 2/1908 | Weber, Jr. . | |
| 1,497,638 | * | 6/1924 | Powell . | |
| 1,592,701 | * | 7/1926 | Peelle . | |
| 4,621,825 | | 11/1986 | Lee . | |
| 4,861,054 | * | 8/1989 | Spital | 280/221 |
| 4,861,055 | | 8/1989 | Jones . | |
| 5,280,935 | * | 1/1994 | Sobocan . | |
| 5,310,202 | | 5/1994 | Goodspeed . | |
| 5,620,189 | * | 4/1997 | Hinderhofer | 280/5.24 |
| 5,927,732 | * | 7/1999 | Snyder | 280/87.01 |
| 6,079,727 | * | 6/2000 | Fan | 280/265 |

* cited by examiner

*Primary Examiner*—Kevin Hurley
(74) *Attorney, Agent, or Firm*—Howard Cohen

(57) ABSTRACT

A foot driven vehicle utilizing a platform. The platform is motivated on a surface utilizing a foot pedal connected to a crank. The crank further includes an endless surface which is linked to a first wheel supported directly to the bottom of the platform. An element which is engageable by a foot or gripable by a hand, is linked to a second wheel supported by the bottom of the platform. The element is movable to turn the second wheel for the purposes of steering. A brake is also included in the present invention for arresting the turning of the first and/or second wheels. The brake includes a flange which is also operated by the foot of the user. A ratchet may also be used in the first wheel to bias rotation of the same.

11 Claims, 5 Drawing Sheets

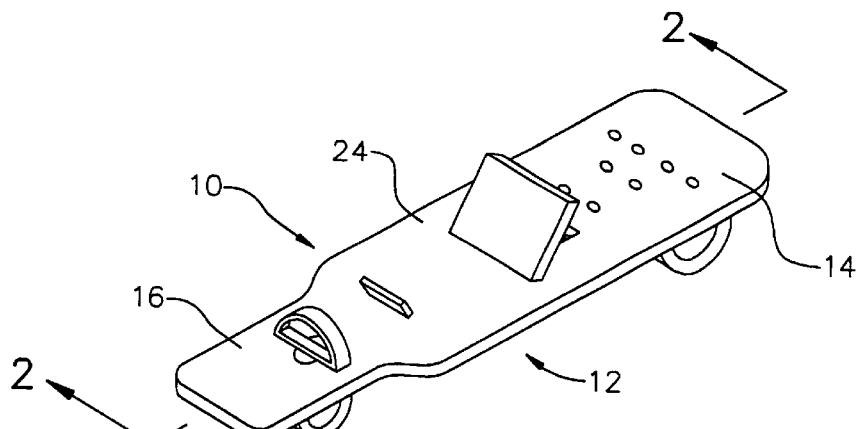
FIG. 1
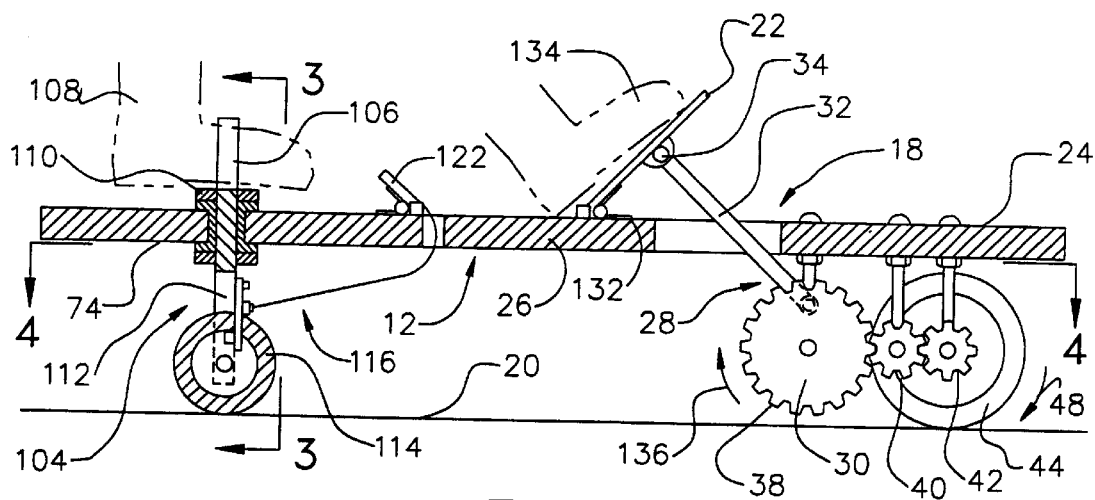
FIG. 2
FIG. 3

DRIVE MECHANISM FOR VEHICLE

CROSS REFERENCES TO RELATED APPLICATIONS

The present application is a Continuation-in-Part of U.S. patent application Ser. No: 09/219,565, filed Dec. 21, 1998.

BACKGROUND OF THE INVENTION

The present invention relates to a novel and useful foot driven vehicle.

Many non-motorized vehicle platforms have been proposed and built in the past. Essentially, these items are noted as being classified as scooters, skateboards, and the like.

Although many of such scooters and skateboards are steerable and dependent on gravitational pull for operation, several designs have been proposed for driving the same.

Reference is made to U.S. Pat. No. 4,621,825 which describes an oscillating platform in which the user shifts his weight to affect forward motion of skateboard.

U.S. Pat. No. 5,310,202 shows a skateboard having a pedal mounted on the upper surface of a platform which drives a horizontally displaceable rack via a cam.

U.S. Pat. No. 4,861,055 shows a scooter having a steering bar and mechanism for converting oscillating motion onto rotary motion through the use of endless chains.

A foot driven vehicle having the capability of complete motional control, including the generating speed, stopping, and steering through foot operated mechanisms would be a notable advance in the recreational vehicle field.

SUMMARY OF THE INVENTION

In accordance with the present invention a novel and useful foot driven vehicle is herein provided.

The foot driven vehicle of the present invention utilizes a platform having motivating means for urging the platform along a surface. The motivating means includes a foot pedal connected to a crank. The crank includes an endless surface linked to a first wheel supported to the platform. The endless surface may include a friction surface or a geared surface which is capable of transmitting the rotation motion of the crank to the wheel connected to the platform. In addition, a spur gear wheel may be located intermediate the crank surface and the wheel supported by the platform. In such an embodiment, the rotation motion of the first wheel supported to the platform would be reversed in direction from the motivating means lacking the spur gear. Other gear arrangements may be employed to vary the rotational speed of the first wheel.

The foot driven vehicle of the present invention may also include a steering element engageable by the foot or gripable by the hand of the user. The element would be linked to a second wheel supported to the platform and would be movable in order to turn the second wheel about an axis generally perpendicular to the platform. Such steering element may include a stirrup-like structure. In addition, the steering element may further comprise a rotatable shaft which is connected to the second wheel and to the stirrup. The shaft may terminate in a handle. A bearing supported by the platform may surround the rotatable shaft to ease the turning of the shaft during the steering process.

Brake means is also provided in the present invention for selectively arresting the turning of the first and second wheels. The brake means may include a hinge flange engageable by the foot of the user. The hinge flange could be linked to a conventional bicycle caliper on either the first or second wheel. The brake means flange may be found on the upper surface of the platform and be in the vicinity of the motivating means foot pedal in order to permit the user to rapidly move a foot between these two control mechanisms.

It should be further noted that a third wheel may be employed in the present invention for movement with the first wheel at the lower side of the platform. The first and third wheels may be motivated by the crank which may have a pair of shafts or a pair of endless surface members such as gear wheels. Such gear wheels may be directly linked to a single or double pinion gear along the axis of the first and third wheels, or may be linked by using an intermediate spur or pinion gear to reverse the direction of turning of the first and second wheels.

In certain embodiments the motivating means may include a ratchet gear axially located relative to the first wheel. Rotational force is transmitted from the crank endless surface to the ratchet gear. Such transfer may be accomplished by a multiplicity of gears engaging the endless surface of the crank. A gear axle may also be formed between two gears of the multiplicity of gears.

Moreover, the first wheel and crank may be directly supported for rotation to the platform to lower the platform relative to the ground surface.

It may be apparent that a novel and useful foot driven vehicle has been heretofore described.

It is therefore an object of the present invention to provide a foot driven vehicle which permits the user to control the same using only the user's feet.

Another object of the present invention is to provide a foot driven vehicle which is as simple to manufacture and maintain.

A further object of the present invention is to provide a foot driven vehicle which generates torque through a gear crank mechanism.

Yet another object of the present invention is to provide a foot driven vehicle which may be safely operated on various surfaces.

Another object of the present invention is to provide a drive mechanism for a vehicle that is stable and easy to steer.

The invention possesses other objects and advantages especially as concerns particular characteristics and features thereof which will become apparent as the specification continues.

BRIEF DESCRIPTION OF THE DRAWINGS

FIG. 1 is a top left side perspective view of an embodiment of the present invention.

FIG. 2 is a sectional view taken along line 2—2 of FIG. 1.

FIG. 3 is a sectional view taken along line 3—3 of FIG. 2.

Figure 4:
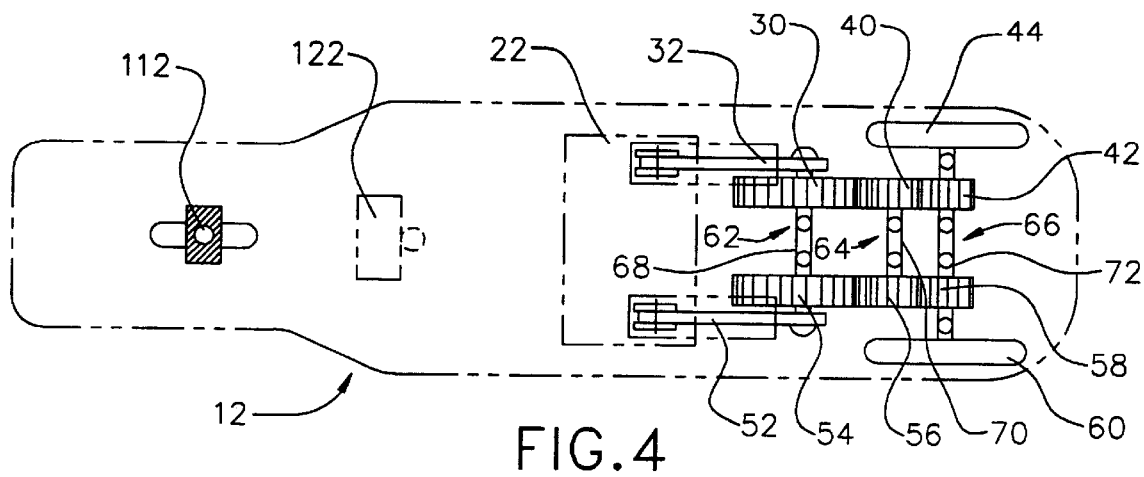
FIG. 4 is a top plan view of an embodiment of the motivating means appearing beneath the platform.

For a better understanding of the invention reference is made to the following detailed description of the preferred embodiments thereof which should be taken in conjunction with the heretofore described drawings.

DETAILED DESCRIPTION OF THE PREFERRED EMBODIMENTS

Various aspects of the present invention will evolve from the following detailed description of the preferred embodiments thereof, which should be referenced to the prior delineated drawings.

The invention as a whole is depicted in the drawings by reference character 10. The foot driven vehicle 10 includes as one of its elements a platform 12 which may include a broad portion 14 and a narrowed portion 16. Platform 12 is shown in the embodiments of the present invention to be in the form of a plate of uniform thickness. Platform 12 may be constructed of any rigid or semi-rigid material such as metal, plastic, wood, and the like.

Figure 9:
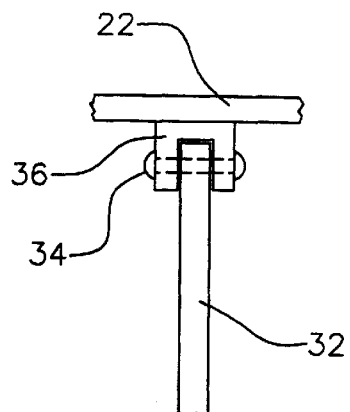
FIG. 9 is a partial end elevational view of the interconnection of the crank arm to the foot pedal depicted in FIGS. 2 and 7.

Turning to FIG. 2, it may be seen that vehicle 10 includes as one of its elements motivating means 18 for urging platform 12 along a surface 20. Motivating means 18 includes a foot pedal 22 attached to the upper surface 24 of platform 12 by hinge 26. Motivating means 18 is further formed with a crank 28 having a gear wheel 30. Crank arm 32 is fastened to gear wheel 30 eccentrically. Arm or rod 32 also connects to foot pedal 22 through a pivot pin 34 which is fastened to a journal 36. Journal 36 is connected to foot pedal 22, FIG. 9. As depicted in FIG. 1, gear wheel 30 may be engaged at its endless surface 38, by spur gear 40, which in turn connects to gear 42 along the axis of first wheel 44.

Figure 7:
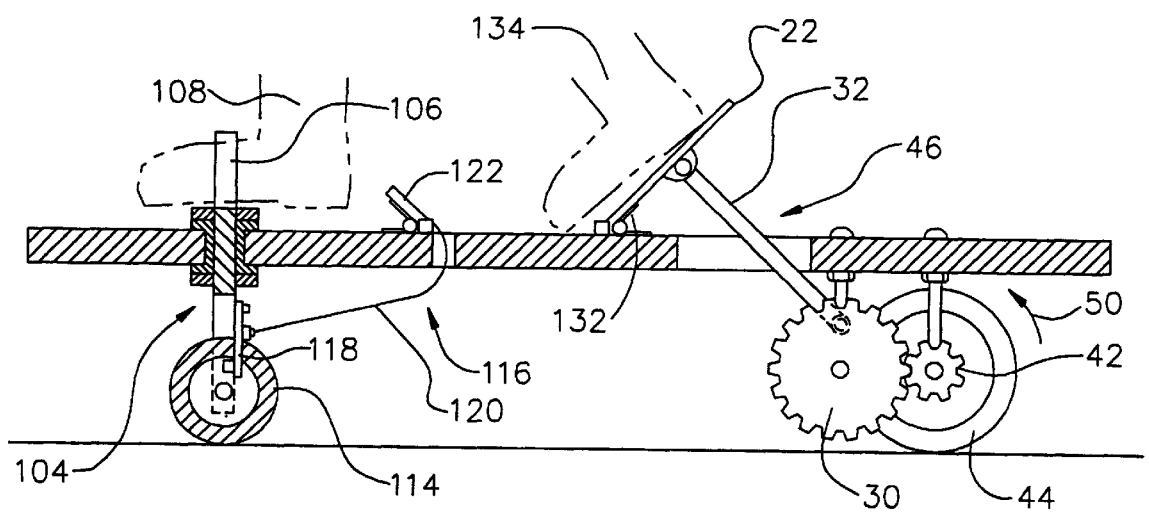
FIG. 7 is a sectional view showing another embodiment of the present invention in which the platform is depicted in section.

Turning to FIG. 7 it may be seen that motivating means 46 includes many of the elements of motivating means 18. However, gear wheel 30 directly connects to gear 42 on wheel 44. Thus, with respect to FIGS. 2 and 7 it may be apparent that first wheel 44 turns in an opposite direction when motivating means 18 or 46 is employed, directional arrows 48 and 50, FIGS. 2 and 7.

Figure 5:
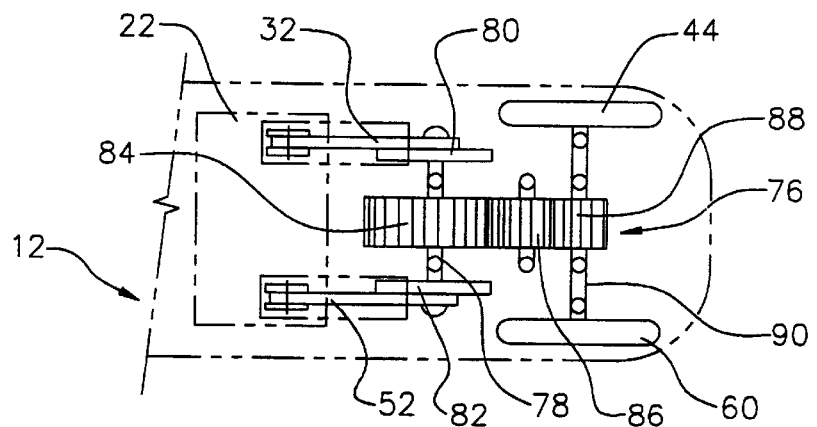
FIG. 5 is another embodiment of the motivating means appearing beneath the surface of the platform.
Figure 6:
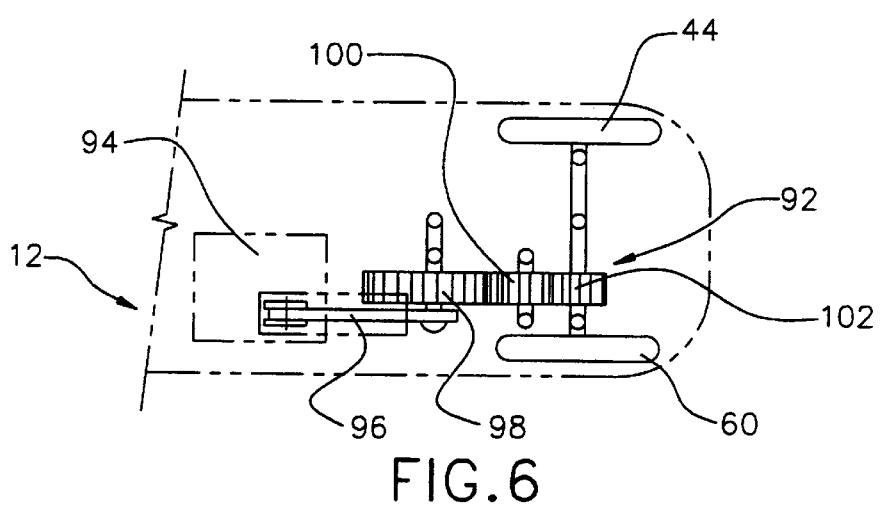
FIG. 6 is yet another embodiment of the motivating means appearing beneath the surface of the platform.

Turning now to FIGS. 4–6, it may be observed that variations of motivating means 18 is depicted. In FIG. 4, crank arm 52 is linked to gear wheel 54, spur gear 56, and gear 58 associated with wheel 60. Crank arm 52 is connected to pedal 22 in the same manner as crank arm 32. Pairs of shafts 62, 64, and 66 hold axles 68, 70, and 72 to the lower surface 74 of platform 12. Of course, axle 72 supports gears 42 and 58, as well as wheels 44 and 60.

FIG. 5 depicts another modification of the present invention 10, in which another motivating means 76 is depicted. Cranks 32 and 52 again are connected to foot pedal 12, but a single axle 78 connects discs 80 and 82 to gear wheel 84. Of course, arms 32 and 52 are eccentrically connected to discs 80 and 82 in the same manner as the connection depicted in FIG. 2 between rod 32 and gear wheel 30. Axle 78 then turns gear wheel 84 which in turn activates spur gear 86 and gear 88 fixed to axle 90 between wheels 44 and 60.

FIG. 6 depicts yet another embodiment of a motivating means 92. A foot pedal 94 of shortened configuration turns crank arm 96 which is eccentrically connected to gear wheel 98. Spur gear 100 and wheel gear 102 are turned according to the FIG. 2 depiction showing the turning of wheels 44 and 60.

Referring now to FIG. 2 once again, steering element 104 is shown. Steering element 104 includes a stirrup 106 engageable by a foot 108 of the user. Bearing 110 permits shaft 112 to turn within platform 12. Shaft 112 is connected to steering wheel fork, and axle 114 along an axis generally perpendicular to lower surface 74 of platform 12. It should be noted that steering element 104 depicted in FIG. 7 is substantially the same as that depicted in FIG. 2 except that foot 108 enters stirrup 106 from a different direction.

Figure 8:
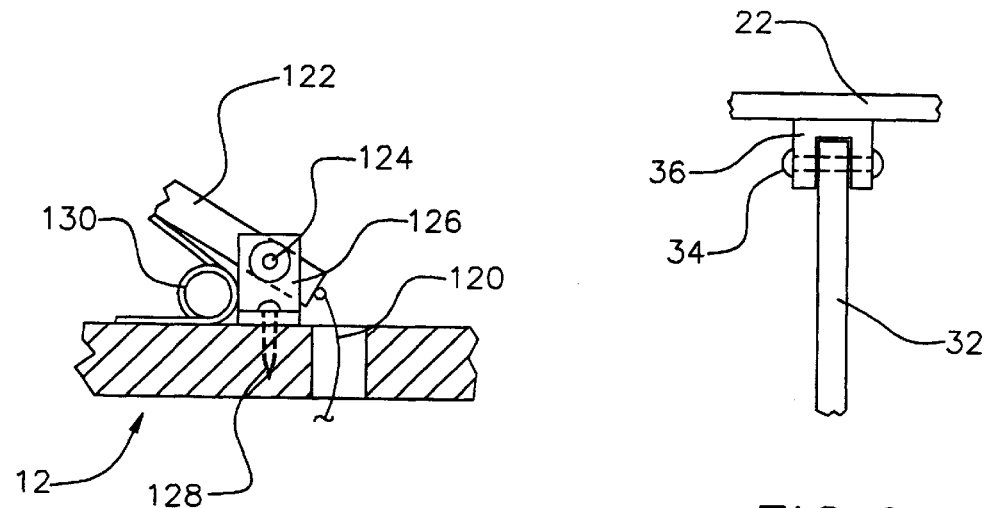
FIG. 8 is an enlarged side view of a portion of the brake mechanism mounted on the top portion of the platform.

Brake means 116 is also found in the present invention. Brake means 116 includes a padded calliper 118 of conventional bicycle configuration with respect to steering wheel, fork and axle 114, FIG. 6 and 7. Cable 120 leads from a pedal 122 which is pivotally mounted by a pivot pin 124 by bracket 126. Bracket 126 is held to platform 12 by a fastener 128 which may be a screw, bolt, glue compound, and the like. Spring 130 biases pedal 122 into the position shown in FIG. 8. It should be noted that spring 132 also biases pedal 22 in the same manner to the position shown in FIGS. 2 and 7.

Figure 10:
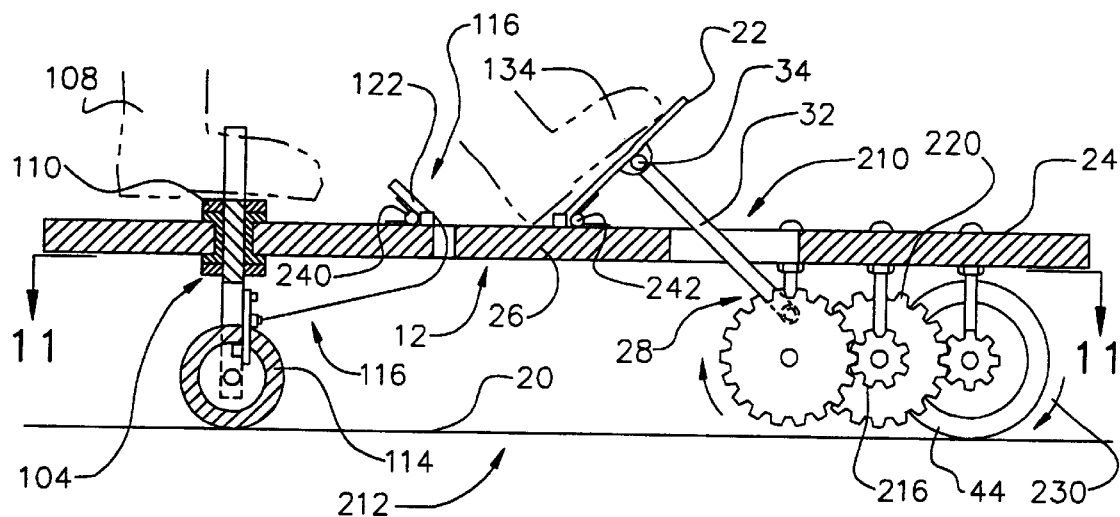
FIG. 10 is a sectional view depicting another embodiment of the present invention.
Figure 11:
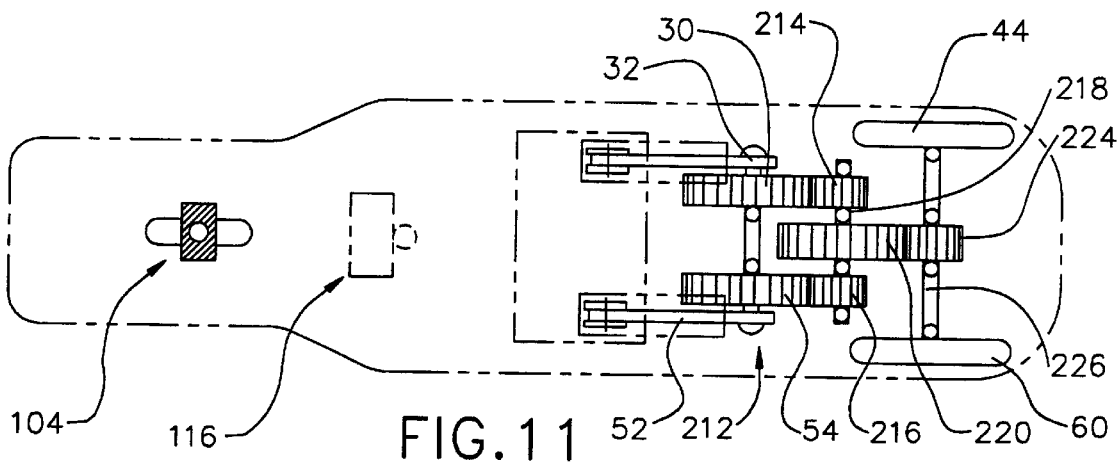
FIG. 11 is a bottom plan view of the embodiment of FIG. 10.
Figure 13:
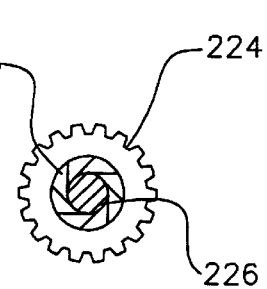
FIG. 13 is a side elevational view of the ratchet mechanism used in the embodiment of FIG. 10.
Figure 12:
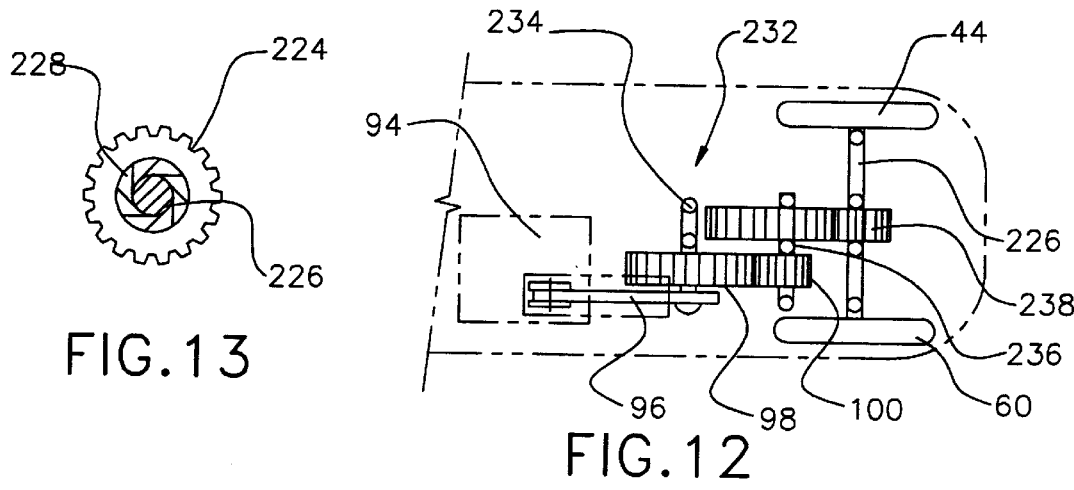
FIG. 12 is a bottom plan view of an alternate gear arrangement for the embodiment of FIG. 10.

Turning now to FIGS. 10–12, another embodiment 210 is depicted. Common elements with respect to embodiment 10 of FIGS. 1–10 are noted by identical reference characters. A plurality of gears 212 turns wheels 44 and 60, FIG. 11. Such turning occurs by the pushing of pedal 22 by foot 134 in the operation of cranks 32 and 52. Gear wheels 30 and 54 mesh with gears 214 and 216. Axle 218 turns gear 220 and engaged gear 224. Axle 226 links to wheels 44 and 60 through a rachet mechanism 228, FIG. 13. Thus, the pressing of pedal 22 downwardly operates embodiment 210 such that wheels 44 and 60 turn according to directional arrow 230, only.

Turning to FIG. 12, it may be observed that another embodiment of the invention is shown in which gear 100 of plurality of gears 232 links to gear 234 via axle 236. Gear 234 engages gear 238 along axle 226, which again links wheels 44 and 60. Gear 238 may also include the ratchet mechanism 228 of FIG. 13.

Returning to FIG. 10, it should be observed that brake pedal 122 and pedal 22 of motivating means 18 includes springs 240 and 242, respectively. Thus, pedals 122 and 22 are biased upwardly away from platform 12 when not in use.

Figure 14:
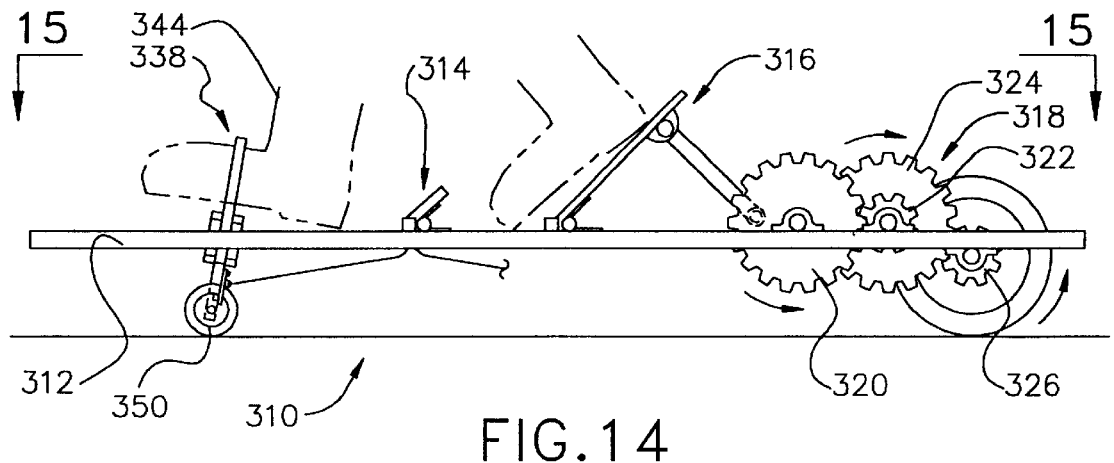
FIG. 14 is a side view of yet another embodiment of the present invention.
Figure 15:
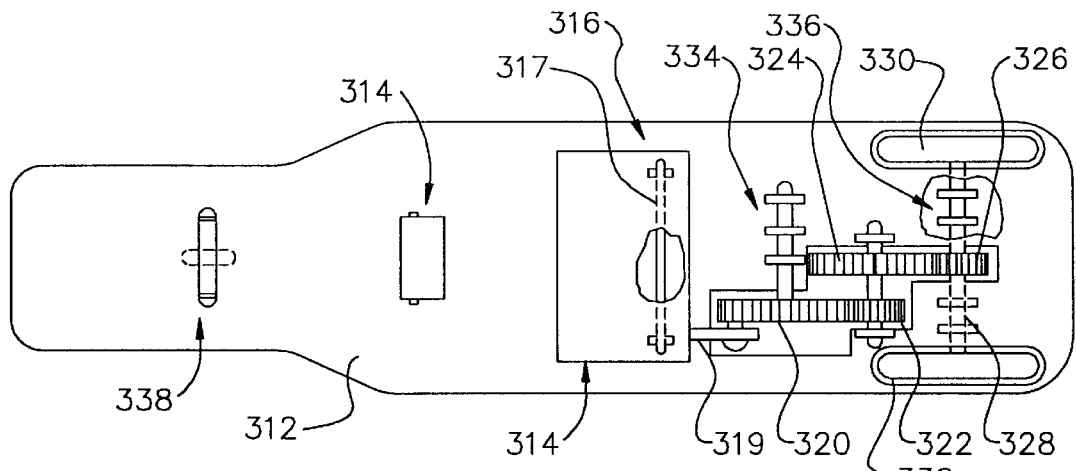
FIG. 15 is sectional view taken along line 15—15 of FIG. 14.
Figure 17:
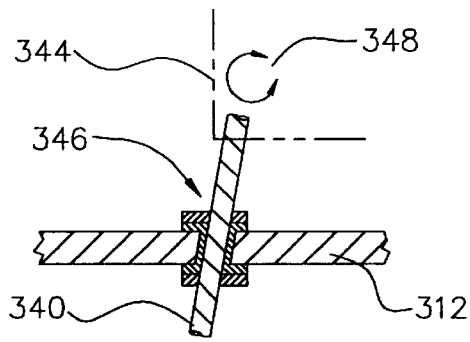
FIG. 17 is a partial sectional view of the steering mechanism depicted in FIG. 16.

Referring now to FIG. 14, another embodiment 300 of the present invention is depicted. Embodiment 310 includes a platform 312 supporting a brake mechanism 314 and a motivating pedal 316. These elements are virtually identical to those described hereinbefore with reference to embodiments 10 and 210, depicted in the prior drawings. Embodiment 310 includes a gear train 318. Specifically, crank arm 319, connected to pedal 316, having a transverse stiffener 317, operates gear 320. Gears 322, 324, and 326 provide rotational movement to axle 328, which rotates wheels 330 and 332. of course, other gear arrangements may be employed in this regard such as those shown in FIGS. 1–13. Most importantly, gears 320, 322, 324, and 326 are directly supported to platform 312. In this regard, gear 320 is held by bearing and shaft support 334. Bearing and shaft support 336 is associated with gears 322 and 324. Finally, axle 328 is supported by a plurality of bearings 336 which also supports gear 326.

Figure 16:
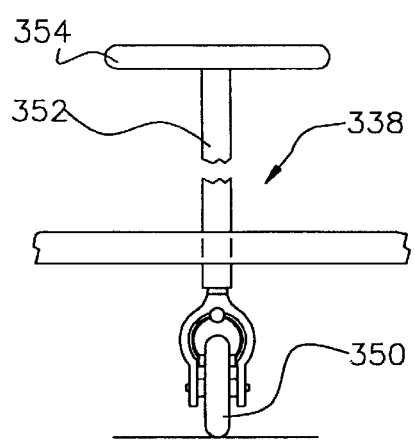
FIG. 16 is a front elevational view of a further embodiment of FIG. 14.

In addition, steering mechanism 338 is depicted in the drawings. Steering mechanism 338 includes a rotatable shaft 340 which possess a stirrup 342 that is engageable by a foot 344, shown in phantom on FIG. 14. Stirrup 342 extends or projects angularly relative to an axis 344 perpendicular to platform 312. It should be noted that a shaft 352 may extend directly to wheel 350 without stirrup 342, FIG. 16. Bearing and shaft support 346 allows stirrup 342 to rotate relative to platform 312, directional arrow 348. Wheel 350, thus, moves to direct vehicle 310. Wheel 350 may include a pair of wheels rather than the single wheel shown in FIGS. 14 and 16, coaxially connected. In addition, a shaft 352 and a handle 354 may be employed, FIG. 16, to permit the user to hold the same and aid in the steering of vehicle 310 by rotating handle 354. It should be noted that brake 314 may be either connected to wheel 350 and/or to the rear wheels 330 and 332. The brake mechanism for such wheels may be identical to that shown in the embodiments 10 or 210, prior described.

In operation, the user utilizes the mechanism 10 depicted in FIG. 2 by placing one foot 108 into stirrup 106 to steer wheel 114 by turning shaft 112. Another foot 134 presses pedal 22 to turn gear wheel 30 according to directional arrow 136. Wheel 44 or pairs of wheel 44 and 60 then move shown by directional arrow 48. The turning of crank and gear wheel 30 causes similar motion in wheels 44 and 60 as depicted in FIGS. 4–6. In the embodiment shown in FIG. 2, the user presses brake pedal 122 which operates the calliper and pads 118 on steering wheel 114 in the embodiment shown in FIGS. 2 or 7. It should be noted, however, that foot 134 in the embodiment shown in FIG. 2 would leave pedal 22 and move backwardly toward pedal 122 to activate brake means 116. In FIG. 7, foot 134 would leave foot pedal 122 and move forwardly to operate brake 116 by pressing pedal 122. In either case, the user of vehicle 10 has complete motional control.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A drive mechanism for a vehicle, comprising:
   a. a platform;
   b. motivating means for moving said platform along a surface, said motivating means comprising a foot pedal connected to a crank, said crank including an endless surface linked to a first wheel said first wheel and said crank directly secured to said platform;
   c. a steering element engageable by a foot, said steering element linked to a second wheel supported to said platform, said element being movable to turn a second wheel; and
   d. brake means for selectively arresting the turning of at least one of said first and second wheels.

2. The drive mechanism of claim 1 in which said motivating means further comprises a hinged flange engageable by a foot, said hinged flange being selectively linked to a caliper engaging at least one of said first and second wheel.

3. The drive mechanism of claim 1 in which said motivating means further comprises a gear wheel located intermediate to and contacting said endless surface of said crank and said wheel supported to said platform.

4. The drive mechanism of claim 1 in which said steering element further comprises a rotatable shaft and a stirrup said rotatable shaft and stirrup being connected to said second wheel.

5. The drive mechanism of claim 4 which additionally comprises a bearing surrounding said rotatable shaft.

6. A drive mechanism for a vehicle, comprising:
   a. a platform;
   b. motivating means for moving said platform along a surface, said motivating means comprising a foot pedal connected to a crank, said crank including an endless surface linked to a first wheel, said first wheel and said crank directly supported on an upper surface of said platform;
   c. a steering element, said steering element comprising a shaft extending outwardly from said platform, said steering element linked to a second wheel and being movable to turn said second wheel;
   said shaft including means for removably securing operator engagement means for turning said shaft and steering said second wheel, said operator engagement means including either one of a foot-engaging stirrup and a hand-engaging handle assembly; and
   d. brake means for selectively arresting the turning of at least one of said first and second wheels.

7. The drive mechanism of claim 6 in which said steering element further comprises a bearing surrounding said shaft linked to said second wheel, said bearing and shaft positioned to provide a caster relative to said platform.

8. The drive mechanism of claim 6 in which said brake means comprises a hinged flange engageable by a foot, said hinged flange being selectively linked to a caliper engaging either of said first and second wheels.

9. The drive mechanism of claim 6 in which said motivating means further comprises a gear wheel located intermediate to and contacting said endless surface of said crank and said wheel supported on said platform.

10. The drive mechanism of claim 1 in which said foot pedal includes a transverse stiffener.

11. The drive mechanism of claim 6 in which said foot pedal includes a transverse stiffener.

* * * * *